Aug. 4, 1953

C. A. NICHOLS ET AL 2,648,022

COMMUTATOR FOR DYNAMOELECTRIC MACHINES

Original Filed Nov. 29, 1947

INVENTORS.
CHARLES A. NICHOLS, WILLIAM A. FLETCHER
CARL L. CLEVENGER, FOREST L. ZION

BY
their ATTORNEYS

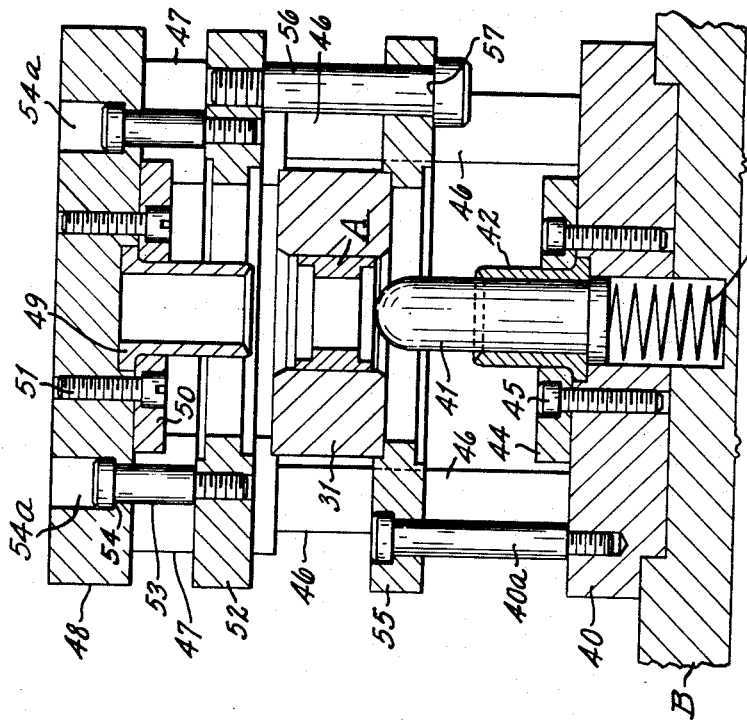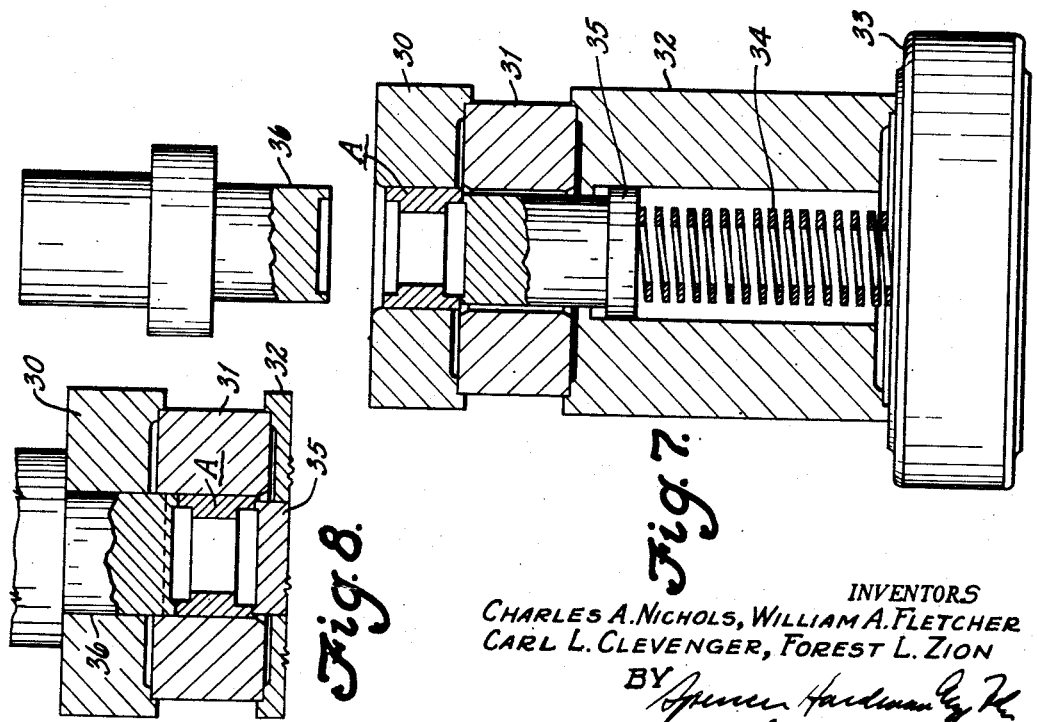

Aug. 4, 1953
C. A. NICHOLS ET AL
2,648,022
COMMUTATOR FOR DYNAMOELECTRIC MACHINES
Original Filed Nov. 29, 1947
5 Sheets-Sheet 3
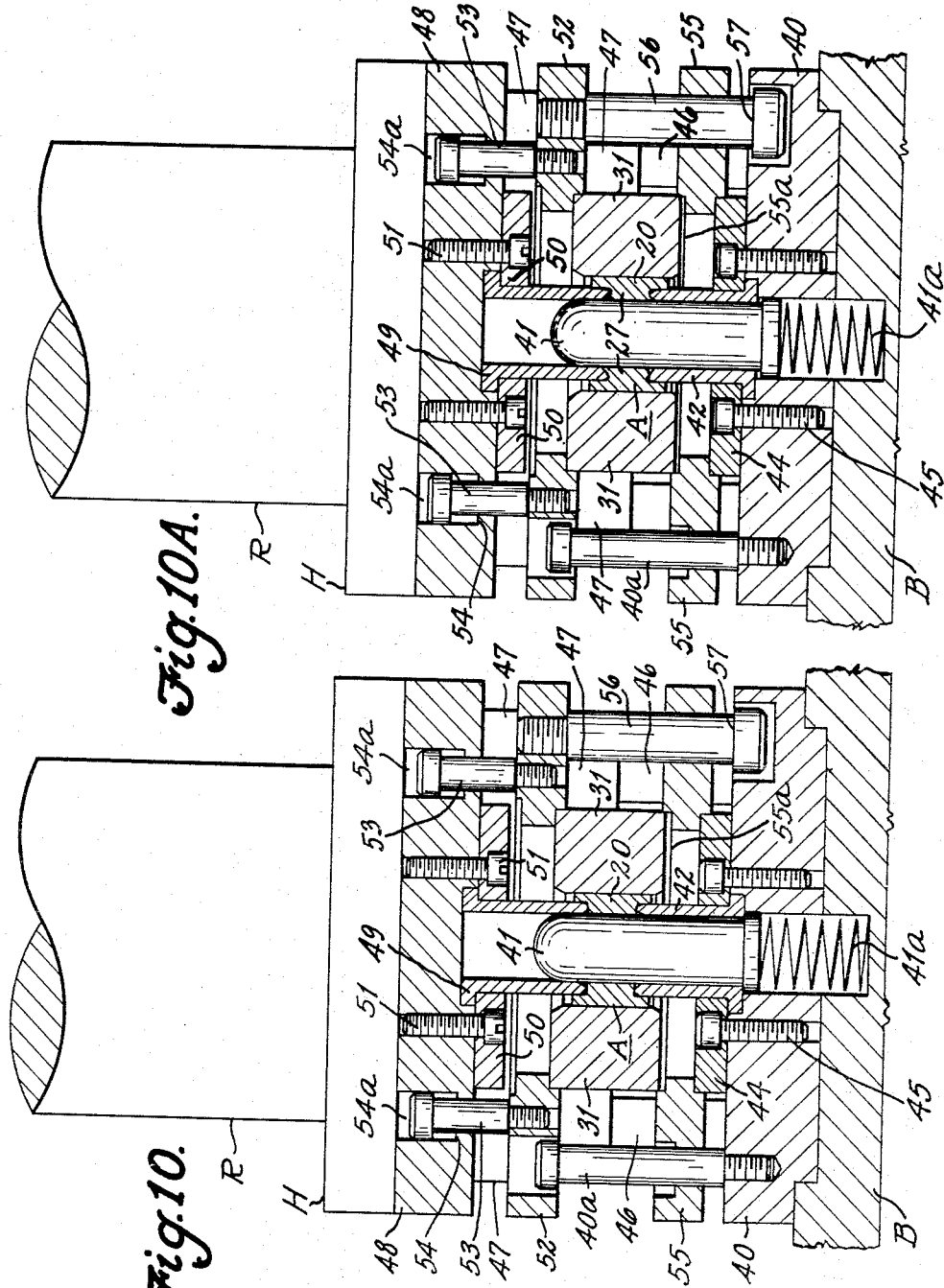
INVENTORS
CHARLES A. NICHOLS, WILLIAM A. FLETCHER
CARL L. CLEVENGER, FOREST L. ZION
BY
their ATTORNEYS

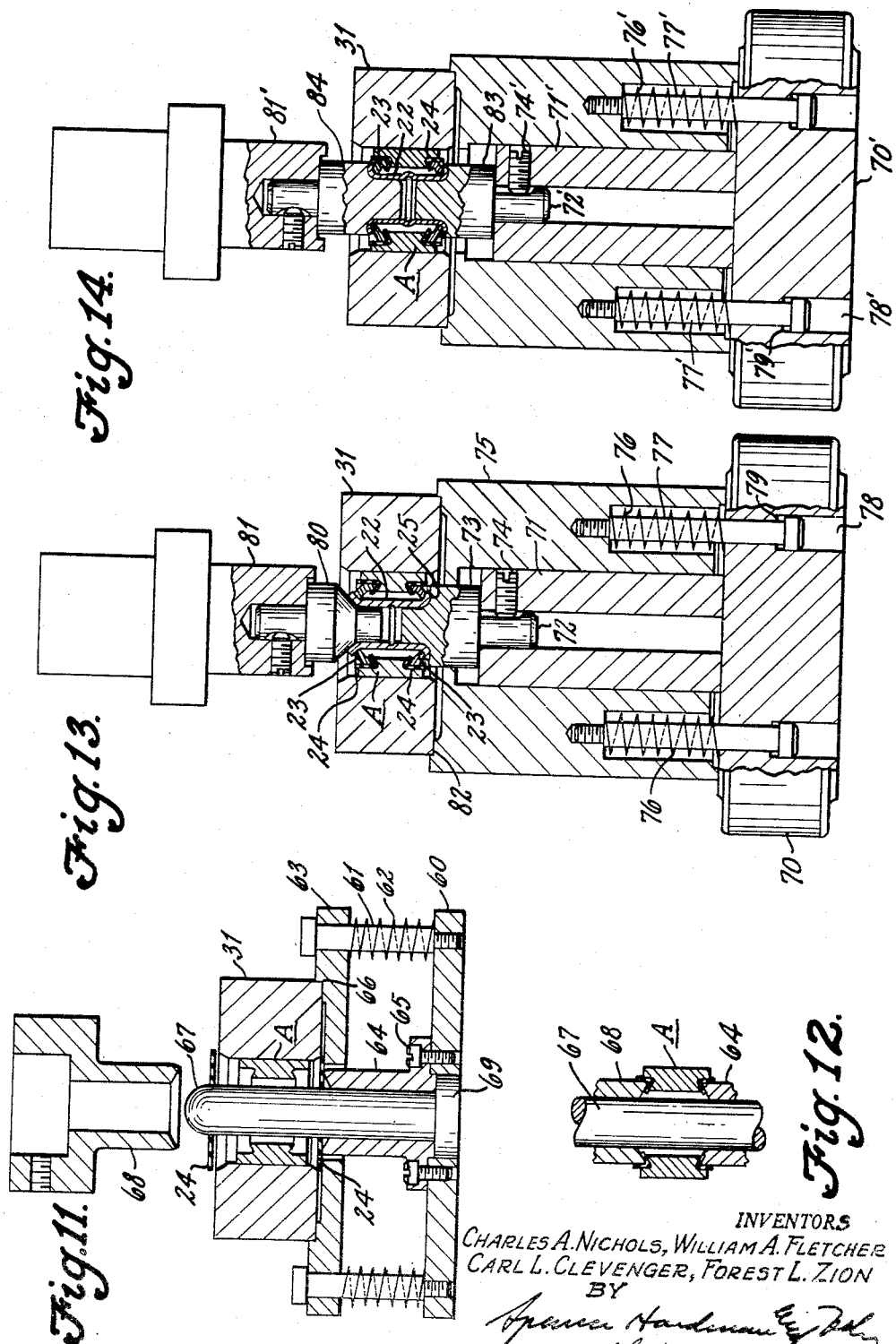

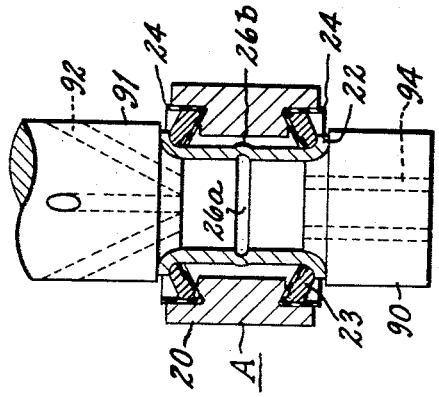
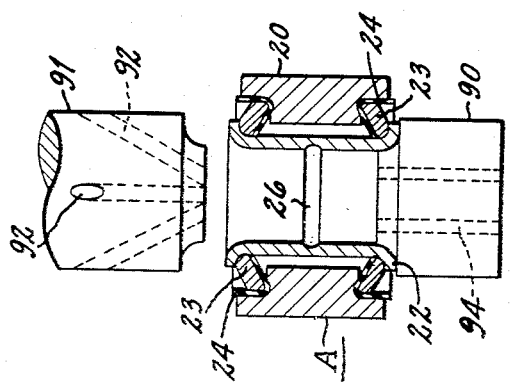
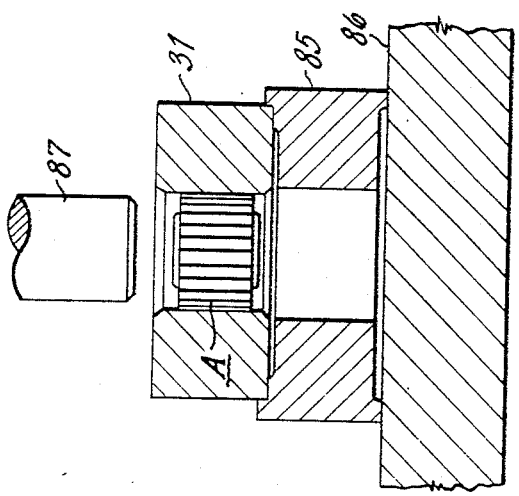

Patented Aug. 4, 1953

2,648,022

UNITED STATES PATENT OFFICE 2,648,022

COMMUTATOR FOR DYNAMOELECTRIC MACHINES

Charles A. Nichols, Carl L. Clevenger, and Forest L. Zion, Anderson, and William A. Fletcher, Daleville, Ind., assignors to General Motors Corporation, Detroit, Mich., a corporation of Delaware Application August 1, 1950, Serial No. 176,982, which is a continuation of application Serial No. 788,942, November 29, 1947. Divided and this application December 4, 1951, Serial No. 259,808

2 Claims. (Cl. 310—236)

This application is a division of application Serial No. 176,982, filed August 1, 1950, which application was a continuation of Serial No. 788,942, filed November 29, 1947, now forfeited.

This invention relates to the manufacture of commutators for dynamoelectric machines and, more particularly, to a commutator comprising an annulus of metal bars and insulating segments, rings insulated from the bars for clamping the bars and a tubular rivet for clamping the rings.

The object of the invention is to provide a method of manufacture which will minimize the possibility of loosening commutator bars. In the disclosed embodiment of the present invention, this object is accomplished by the steps of assembling within a ring an annulus of bars and non-conducting segments, each of said bars having initially a tank, forcing the annulus from the assembling ring into a building ring of smaller internal diameter whereby the parts of the annulus are squeezed together, coining the tangs of the bars while in the second ring into dovetail shape whereby uniform V-grooves are provided, assembling with the annulus clamping rings, insulation thereof, and a tubular rivet having, intermediate its ends, a section of reduced thickness, staking the rivet to retain the assembly, removing the assembly from the building ring, and forcing welding electrodes against the ends of the rivet while applying electric current in order to effect shortening of the rivet by hot-upsetting of its section of reduced thickness and thereafter discontinuing the electric current and cooling the rivet while the electrode pressure is maintained.

Further objects and advantages of the present invention will be apparent from the following description, reference being had to the accompanying drawings, wherein a preferred embodiment of the present invention is clearly shown.

In the drawings:

Fig. 7 is a longitudinal, sectional view of apparatus for transferring an annulus of the commutator bar insulators from an assembling ring into a building ring;

Fig. 8 is a fragmentary, sectional view showing the annulus after being forced from the assembling ring into the building ring;

Fig. 9 is a longitudinal, sectional view of the apparatus for coining the dovetailed tangs of the commutator bars;

Figs. 10 and 10A are views similar to Fig. 9, showing parts of the apparatus in other positions;

Fig. 11 is a longitudinal, sectional view of the apparatus for forcing the V-ring insulation into the V-ring grooves of the commutator bars;

Fig. 12 is a fragmentary view showing the operation performed by the apparatus shown in Fig. 11;

Figs. 13 and 14 are longitudinal, sectional views of the apparatus for performing, respectively, the first and second operations of staking the core against the V-rings;

Fig. 15 is a longitudinal, sectional view of the apparatus for removing the assembled commutator from the building ring;

Fig. 16 is a longitudinal, sectional view of the apparatus for hot-upsetting the core; and Fig. 17 is a view similar to Fig. 16, showing the condition of the core after being hot-upset.

Figure 2:
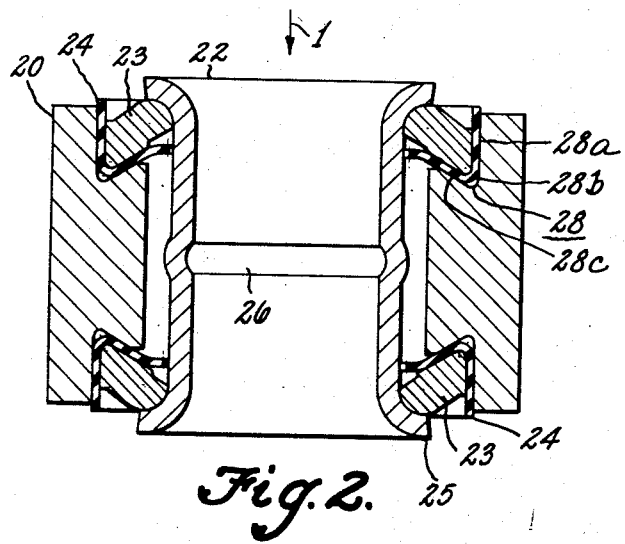
Fig. 2 is a sectional view on the line 2—2 of Fig. 1 of a commutator built by the method of the present invention.
Figure 4:
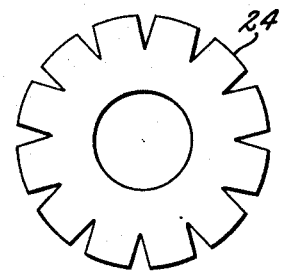
Fig. 4 is a plan view of one of the insulating rings.
Figure 5:
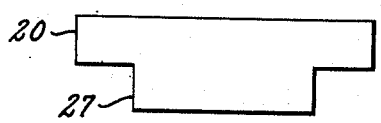
Figs. 5 and 6 are side and end views, respectively, of a commutator bar.
Figure 6:
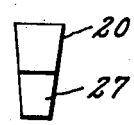

The commutator, which is to be built according to the present method, comprises an annulus of the commutator bars 20 and insulating segments 21 clamped together by a tubular rivet or central core 22, the ends of which are formed against V-rings 23 which are insulated from the bars by non-conducting rings 24. The core 22 is formed preferably from sheet steel and is provided initially with a flange 25 and with an internal annular groove 26 whereby the thickness at sections $a$—$b$ is substantially less than at other parts of the core. The insulating rings 24 each provide a plurality of (preferably four) superimposed washers (Fig. 4) of glass cloth. Fig. 4 is drawn to half the scale of Fig. 2. The insulating segments 21 are substantially the same shape as the bars 20 as shown in Fig. 5. The tangs 27 of each bar 20 is not initially shaped as shown in Fig. 2 but is shaped as shown in Fig. 5.

The required number of bars 20 and insulating segments 21 are assembled into an annulus A within an assembling ring 30 (Fig. 7). Ring 30 is then placed upon a building ring 31 which rests on a support 32. The support 32 rests on a base 33. The support 32 encloses a spring 34 urging upwardly a plunger 35 for receiving the annulus A. Plunger 36 moves from the position shown in Fig. 7 to that shown in Fig. 8 to force the annulus A from the assembling ring 30 into the building ring 31.

The building ring 31 containing annulus A is then transferred to the apparatus shown in Figs. 9, 10 and 10A for coining the tangs of the commutator bars into dovetail tangs. This apparatus comprises a base 40 adapted to be mounted upon the bed B of a press and supporting a mandrel 41 urged upwardly by a spring 41a and surrounded by a die 42 which receives the flange of the mandrel. The die 42 is attached to the base 40 by ring 44 secured by screws 45. The base supports posts 46, the upper ends of which extend into sleeves 47 provided by a plate 48 attached to the movable head H (Fig. 10) connected with the piston rod or ram R of an hydraulic press. Plate 48 supports an upper die 49 secured by a ring 50 attached by screws 51 to the plate 48. A plate 52 is supported by the plate 48 by screws 53 threaded in the plate 52, the heads of screws 53 bottoming on shoulders 54 at the bottom of counterbores 54a which receive the heads of screws 53. Plate 52 supports a plate 55 by screws 56 which extend through plate 55 which rest upon surfaces 57 of the heads of the screws 56. Plate 55 receives screws 40a attached to plate 40. When the press is operated to cause the plate 48 to move down, the plate 55, which supports the building ring 31 with the annulus A therein, is caused to descend so that it is supported by die 42 as shown in Fig. 10, since the annulus A of commutator bars, which engage the die 42, supports the ring 31. As the plate 48 moves down from the position shown in Fig. 10 to the position shown in Fig. 10A, the tangs 27 of bars 20 are squeezed between the dies 42 and 49 and against the mandrel 41 thereby forming the bar tangs, initially shaped (as shown in Fig. 5) into dovetail tangs, as shown at 27 in Fig. 10A.

As their tangs are shaped between the dies 42 and 49, the bars 20 move down from the position shown in Fig. 10 to that shown in Fig. 10A. During tang formation, the bars 20 are confined by ring 31 so that outward movement of metal is prevented. Metal of the bars is permitted to flow inwardly to a limited extent against the mandrel 41 which confines the metal to flow along it and into the spaces between the ends of the dies 42 and 49. Thus the inner surfaces of the bar tangs are caused to conform to the shape of the mandrel and the end surfaces of the tangs are caused to conform to the surfaces of the dies. Thus the tangs are accurately shaped to uniform dimensions so that the bars provide uniform V-grooves 28 (Fig. 2) each defined by a cylindrical surface 28a and conical surfaces 28b and 28c adapted to receive the insulating rings 24 and clamping rings 23 which fit the V-grooves 28 accurately. Because these V-grooves are each concentric with respect to the mandrel 41, they are coaxial.

Because the bars are confined between the ring 31 and the mandrel 41 during tang formation, they exert pressure on the ring and mandrel which increases as tang formation progresses. Therefore it is necessary that the ring 31 and mandrel 41 be permitted to float down with the bars 20 as they descend from the position shown in Fig. 10 to that shown in Fig. 10A. Recess 55a of plate 55 provides clearance for downward floating of ring 31; and mandrel 41 floats down against the action of spring 41a.

During return of the plate 48 from the position shown in Fig. 10A to that shown in Fig. 9, mandrel 41 is moved up by spring 41a until its flange engages the lower end of die 42. The bars 20 and the ring 31 rise with the mandrel. Since the annulus of bars grip the mandrel 41 with pressure greater than they grip the die 49, the latter is retracted from the bars 20. The plate 48 picks up the screws 53 which are attached to plate 52. As plate 52 rises, screws 56 attached thereto pick up the plate 55. As plate 55 rises, it engages the ring 31 and lifts it to strip the bars 20 from the mandrel.

The building ring 31 carrying the annulus A is transferred to the apparatus shown in Fig. 11, which comprises a plate 60 supported on a bed of an hydraulic press and supporting studs 61 surrounded by springs 62 which support a plate 63 in an elevated position. Plate 60 supports a lower die 64 secured by screws 65. Plate 63 provides a counterbore 66 for receiving the ring 31. Before the ring 31 is placed on the plate 63 an insulating ring 24 comprising a plurality of discs 26 is placed upon the plate 63 and around a guide pin 67 located centrally of the die 64 and having a flange 69 which rests upon the bed of the press. After the ring 31 is placed upon the plate 63 a second ring 24 comprising a plurality of discs 26 is placed around the pin 67. Then an upper die 68, supported by the ram of the press is caused to descend to force the upper ring 24 into the upper V-groove of the annulus A and to force the annulus against the lower ring 24 and the latter against the die 64 so that both rings 24 are forced by the dies 68 and 64 into the V-grooves of the annulus as shown in Fig. 12. The glass cloth of which each layer of ring 24 is made, is impregnated with a substance, such that the pressure applied by the dies causes this substance to be heated slightly so that the rings retain the shape given to them by the dies and the rings remain in the V-grooves of the annulus.

The first staking operation is performed by the apparatus shown in Fig. 13. This apparatus comprises a base 70 adapted to be supported by the bed of a press and supporting a tube 71, the inner bore of which receives the stem 72 of a die 73 secured by a screw 74. The tube 71 provides a guide for a stripper block 75 which normally is slightly above the block 70 and is then supported by spring 76 surrounding screws 77 threaded into the block 75 and having their shanks guided for vertical movement by the base 70 and having their heads movable in recesses 78 in base 70. The shoulders 79 of the recesses 78 receive the heads of screws 77 when the springs 76 are permitted to expand. The die 73 cooperates with a die 80 supported by a die holder 81 attached to the ram or movable head (not shown) of the press. When the upper die 80 is in its upper position, a core 22 is placed flange end down upon the die 73 and a lower V-ring 23 is placed upon said flange. Then the building ring 31 with the annulus A, whose V-grooves have received the insulators 24 as shown in Fig. 12, is placed upon the block 75 which has a counterbore 82 for receiving the ring 31. An upper V-ring 23 is placed around the core 22 and within the upper V-groove of the annulus. When the ram of the press is caused to descend thereby forcing the die 80 against the upper edge of the core 22 to cause it to flare outwardly as shown in Fig. 13, thereby performing the first staking operation. Incidentally, the ring 31 moves down and urges the block 75 toward the base 70 against the action of springs 76. When the upper die 80 rises, the springs 76 expand to raise the block 75 in order to strip the work from the die 73.

The second staking operation is performed by the apparatus shown in Fig. 14 which is similar to Fig. 13, except the lower die 83 and the upper die 84 are shaped so as to cause the ends of core 22 to be curled around the V-ring as shown best in Fig. 2. Parts in Fig. 14 which are identical with those shown in Fig. 13 have the same reference numbers with primes affixed. Although the pressure employed in the second operation is relatively high, when this pressure is removed, due to the resiliency of core 22, the core ends spring back and relieve the pressure upon the V-rings. The reduced pressure is insufficient to prevent loosening of the bars when the commutator is subjected to high speed of rotation.

Figure 1:
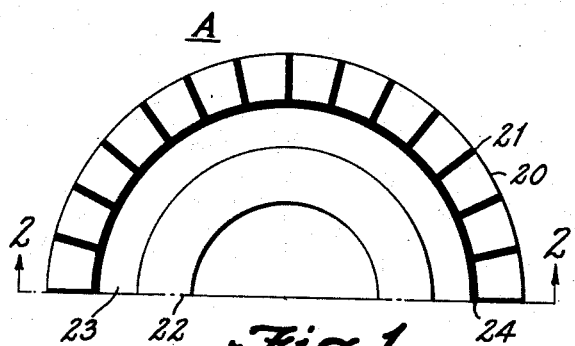
Fig. 1 is a fragmentary, end view looking in the direction of the arrow 1 of Fig. 2.
Figure 3:
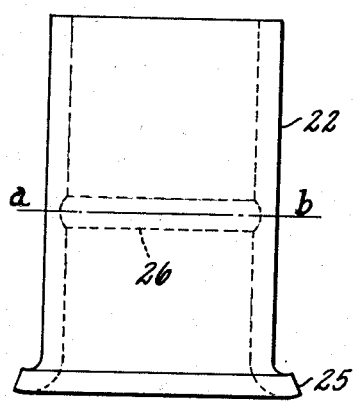
Fig. 3 is a side view of the core or tubular rivet.

The next step is to remove the staked commutator from the building ring 31. The ring is placed upon a C-ring 85 (Fig. 15) resting upon a support 86 and a plunger 87 is caused to descend to force the commutator from the ring 31 into the opening in the ring 85 which is substantially larger in diameter than the commutator. Next the commutator core 22 is hot-upset. This is done by placing the commutator upon a lower electrode 90 and an upper electrode 91 is caused to descend upon the core 22 and the electric current is caused to pass through the core. Since the section of the core on the line a—b (Fig. 3) is less than the other portions, the electrical resistance at this section of the core is greater. Therefore there is a localization of the heat developed by the passage of electric current and the portion of the core at the groove 26 becomes softer than other portions. The application of pressure by the electrodes while current passes causes a decrease in the length of the core 22. The groove 26 becomes slightly narrower as indicated at 26a; and the material which is displaced incidental to the decrease in length causes a bulge or a formation of an annular boss at 26b. While the electrode pressure is still applied the current is turned off and compressed air is caused to flow from passages 94 in electrode 90 through the core 22 and out through passages 92 in electrode 91. The softened material at the groove 26a and the annular boss 26b freezes; and then the electrode 91 is retracted. As the temperature of the commutator is reduced the core shrinks and its flanges tighten upon the V-rings which apply pressure to the bars and segments sufficient to hold them in place against the action of considerable centrifugal force which exists when the commutator is placed in service.

While the embodiment of the present invention as herein disclosed, constitutes a preferred form, it is to be understood that other forms might be adopted.

What is claimed is as follows:

1. A commutator comprising, in combination, a plurality of wedge-shaped commutator bars arranged in an annulus, each bar having a keystone shaped locking wedge in the inner side thereof, a plurality of insulating members, one of which is interposed between each of said bars, a pair of substantially conical pressure members, one of which fits at either end of said bars and engages one end of the keystone portions thereof, insulating means interposed between said pressure members and commutator bars, and a tubular rivet having a central annular weakened portion which provides an axial assembly shrink in situ during assembly for pulling and holding the pressure members under tension in tight engagement with the keystone locking portions of the commutator bars.

2. A commutator for a dynamoelectric machine comprising in combination; a plurality of wedge-shaped commutator bars arranged in a continuous annulus wherein each bar is insulated from the others, integral locking portions extending inwardly toward the center of said annulus from each of said bars, a pair of opposed wedging rings adapted to cooperate with opposite sides of said locking portions and insulated therefrom, and a tubular tension member for holding said rings in tight engagement with the locking portions of said bars, said tension member including opposed out-turned flanges at either end thereof adapted to engage said rings and an intermediate weakened portion bulging annularly outwardly of said member and formed in situ during the assembly operation for holding said rings under tension at all times.

CHARLES A. NICHOLS.
CARL L. CLEVENGER.
FOREST L. ZION.
WILLIAM A. FLETCHER.

References Cited in the file of this patent
UNITED STATES PATENTS

| Number | Name | Date |
|---|---|---|
| 1,835,120 | Poole | Dec. 8, 1931 |

FOREIGN PATENTS

| Number | Country | Date |
|---|---|---|
| 466,637 | Germany | Oct. 8, 1928 |